US011983691B2

(12) United States Patent
Lal et al.

(10) Patent No.: US 11,983,691 B2
(45) Date of Patent: May 14, 2024

(54) SYSTEM AND METHODS FOR DETECTING AND IMPLEMENTING RESOURCE ALLOCATION IN AN ELECTRONIC NETWORK BASED ON NON-CONTACT INSTRUCTIONS

(71) Applicant: BANK OF AMERICA CORPORATION, Charlotte, NC (US)

(72) Inventors: Geetika Lal, New Delhi (IN); Sandeep Kumar Chauhan, Hyderabad (IN); Ramarao Gaddam, Hyderabad (IN); Anil Gajula, Hyderabad (IN); Koteswara Rao Venkata Magham, Hyderabad (IN); Suman Matury, Hyderabad (IN); Santosh Kumar Miryala, Hyderabad (IN); Ravikiran Subramanya Rao, Hyderabad (IN); Yash Sharma, Delhi (IN); Sudarshan Veeramreddy, Hyderabad (IN); Durgesh Singh Yadav, Gautam Buddha Nagar (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 34 days.

(21) Appl. No.: 17/874,649

(22) Filed: Jul. 27, 2022

(65) Prior Publication Data
US 2024/0037529 A1 Feb. 1, 2024

(51) Int. Cl.
G06Q 20/40 (2012.01)
G06Q 20/22 (2012.01)

(52) U.S. Cl.
CPC ......... *G06Q 20/229* (2020.05); *G06Q 20/401* (2013.01)

(58) Field of Classification Search
CPC .................. G06Q 20/229; G06Q 20/401
USPC ..................................... 705/35, 44
See application file for complete search history.

(56) References Cited

U.S. PATENT DOCUMENTS

| 7,284,692 | B1 | 10/2007 | Douglass |
| 7,306,158 | B2 | 12/2007 | Norcross et al. |
| 7,575,166 | B2 | 8/2009 | Mcnamara |
| 7,584,885 | B1 | 9/2009 | Douglass |
| 7,975,910 | B2 | 7/2011 | Artino et al. |
| 8,245,915 | B1 | 8/2012 | Ramachandran et al. |
| 8,630,955 | B2 | 1/2014 | Kurasaki et al. |
| 8,701,990 | B2 | 4/2014 | Meek et al. |

(Continued)

FOREIGN PATENT DOCUMENTS

| CN | 110069199 A | * 7/2019 | ........... G06F 3/0487 |
| JP | 2022110057 A | * 7/2022 | ............. G06F 16/41 |

OTHER PUBLICATIONS

Motion Sensors-based Human Behavior Recognition and Analysis Zhao (Year: 2014).*

*Primary Examiner* — William E Rankins
(74) *Attorney, Agent, or Firm* — Moore & Van Allen PLLC; Nicholas C. Russell

(57) ABSTRACT

Embodiments of the present invention provide an intuitive platform for non-contact instructions regarding resource allocation. In this way, a user may utilize one or more specific gestures which are captured, analyzed, and responded to by the system of the invention in order to initiate or complete one or more resource activities such as a resource transfer, resource transfer split, or other resource action.

17 Claims, 4 Drawing Sheets

(56) References Cited

U.S. PATENT DOCUMENTS

| | | |
|---|---|---|
| 9,022,284 B2 | 5/2015 | Graef et al. |
| 9,031,579 B2 | 5/2015 | Schwent et al. |
| 9,033,221 B1 | 5/2015 | Ramachandran et al. |
| 9,038,894 B2 | 5/2015 | Khalid |
| 9,355,531 B2 | 5/2016 | Graef et al. |
| 9,368,000 B2 | 6/2016 | Ramachandran et al. |
| 10,231,274 B2 | 3/2019 | Raj et al. |
| 10,535,047 B1 | 1/2020 | Thomas et al. |
| 10,692,076 B2 | 6/2020 | Carlson |
| 10,706,400 B1 | 7/2020 | Puffer et al. |
| 10,902,421 B2 | 1/2021 | Badenhorst |
| 10,990,955 B2 | 4/2021 | Skelsey et al. |
| 2010/0114677 A1 | 5/2010 | Carlson et al. |
| 2011/0282785 A1* | 11/2011 | Chin .................... G06Q 20/108 705/42 |
| 2013/0271360 A1* | 10/2013 | Macdougall .......... G06F 3/0484 345/156 |
| 2021/0110362 A1 | 4/2021 | Nonaka |
| 2022/0051666 A1* | 2/2022 | Rodriguez Bravo ........................ G06F 18/2155 |
| 2022/0076264 A1* | 3/2022 | Weinflash ............. H04L 63/102 |

\* cited by examiner

SYSTEM AND METHODS FOR DETECTING AND IMPLEMENTING RESOURCE ALLOCATION IN AN ELECTRONIC NETWORK BASED ON NON-CONTACT INSTRUCTIONS

FIELD OF THE INVENTION

The present invention generally relates to the field of intuitive solutions for performing actions related to network and resource access.

BACKGROUND

In conventional systems, a user may utilize a mobile application or web portal to conduct various activities related to one or more resource accounts. With the advent of improved device sensor technology and intelligent neural network analysis, there is an opportunity to provide a more seamless user experience that incorporates a non-contact gesturing approach to initiate or complete certain resource activities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address the above and/or other needs by providing a system to remove the need for a physical interaction between the user and a user device such that the user can gesture at a certain distance from the user device in order to initiate a specific form of resource action. The present invention utilizes various intelligent systems for image, infrared, and video data analysis in order to provide a touchless experience when interacting with a user device to conduct various activities related to user resource accounts. Embodiments of the present invention may comprise a system that intelligently recognizes and responds to user-specific hand gestures captures by one or more device sensors, such as image sensors, infrared sensors, proximity sensors, or the like. Using the present invention, the user may move their hands or fingers in a particular manner to instruct the system to complete a resource activity. For instance, in some embodiments, a user may wish to "split" a resource transfer between multiple parties, and may gesture in a particular manner to instruct the system that the resource transfer should be split. In this way, the user no longer needs to navigate multiple menu systems, buttons, applications, contact lists, or the like, in the course of imitating a split resource transfer. Instead, the user may simply gesture in a scissor-like motion, and the system may intelligently recognize the user's intention of splitting a resource transfer between multiple parties.

For sample, illustrative purposes, system environments will be summarized. Generally, the invention may comprise the steps of: continuously monitor a data capture sensor via a user device; analyze the data capture sensor data using convolutional neural network modeling in order to identify a specific gesture; in response to identification of the specific gesture, generate a prompt for display on the user device indicating an option for a split resource activity; receive an input response via the user device indicating that the user wishes to complete the split resource activity; and map the specific gesture to the split resource activity by initiating a transfer of resources from a resource account of the user to a resource account of one of the user's contacts.

In some embodiments, the invention is further configured to continuously monitor resource account activity of a resource account of the user; identify a first merchant with which the user has transacted multiple times; calculate an average resource value for transactions with the first merchant from the resource account of the user; identify a later resource activity from the resource account of the user to the first merchant that is above a pre-set threshold, wherein the pre-set threshold is a percentage above the average resource value; and generate a push notification to the user device.

In some embodiments, the push notification to the user device further comprises a recommendation or option to initiate a split resource activity.

In some embodiments, the split resource activity comprises a request for payment of resources from one or more of the user's contacts.

In some embodiments, the invention is further configured to monitor a geolocation one or more user devices, cross references the user devices with the user's contacts, and identify one or more specific contacts in proximity to the user at a time coinciding with the later resource activity.

In some embodiments, the one or more data capture sensors further comprise one or more proximity sensors and one or more camera sensors.

In some embodiments, the invention is further configured to store user gesture input data in a user configuration associated with a resource account number and the user's identity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
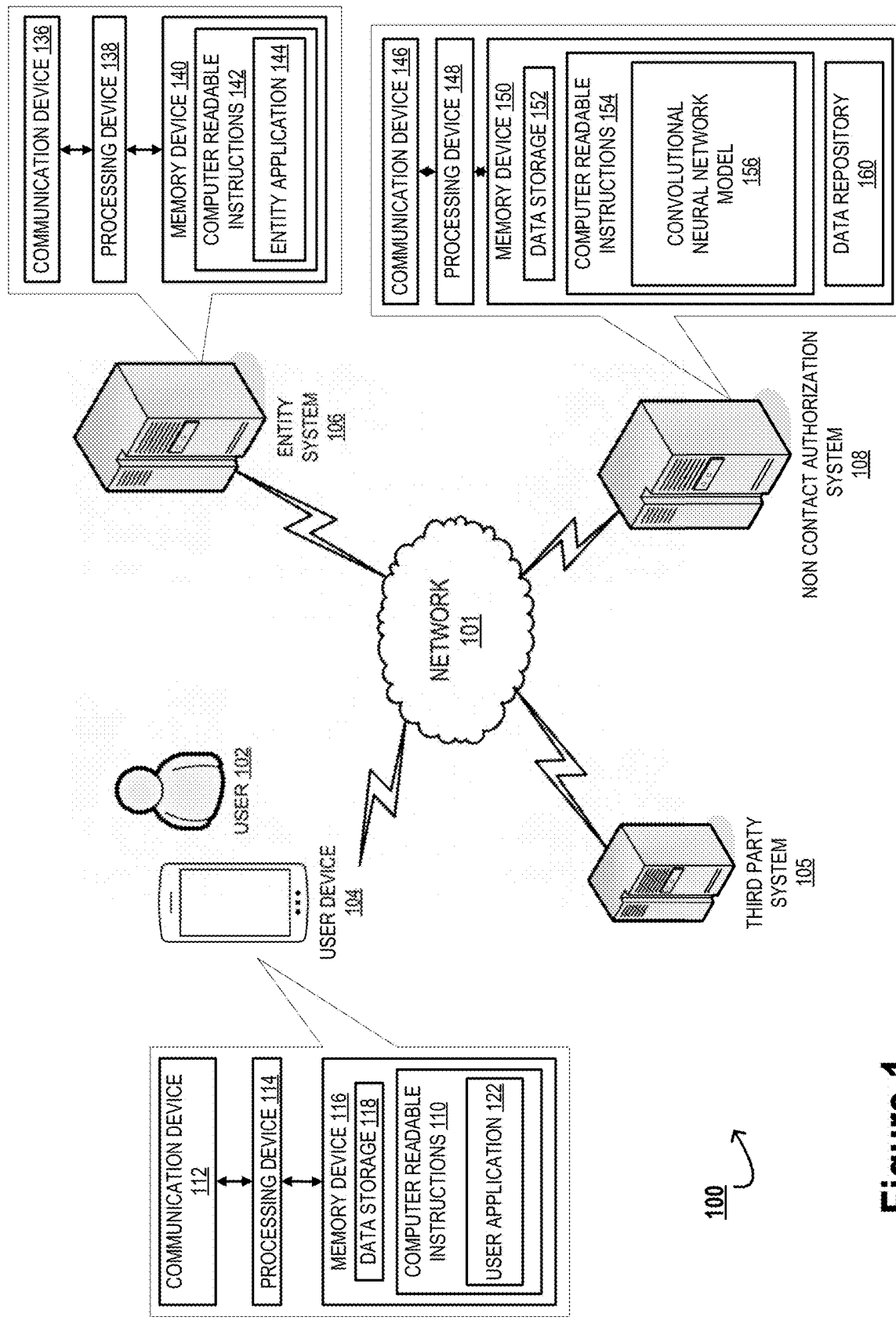
Figure 2:
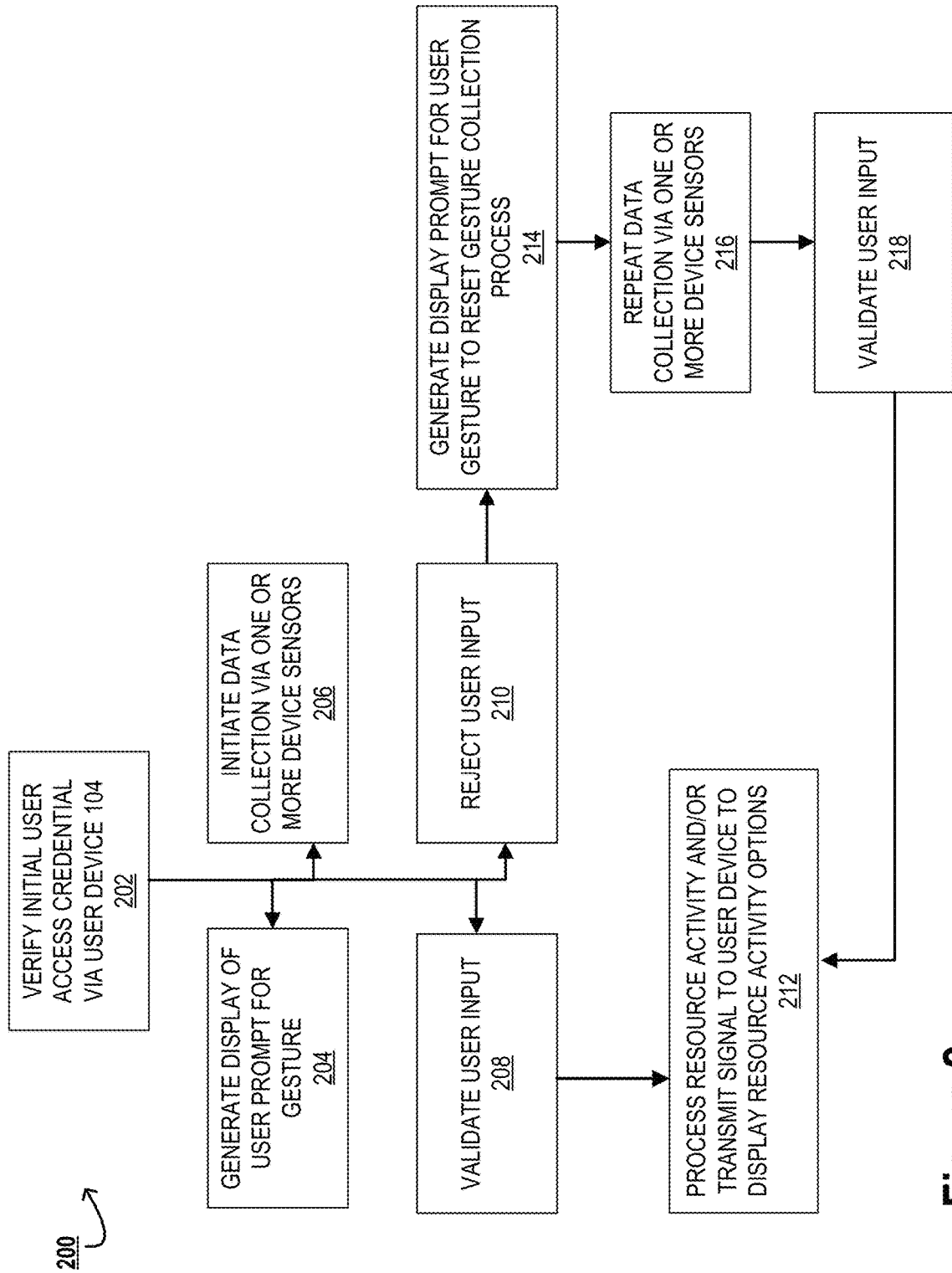
Figure 3:
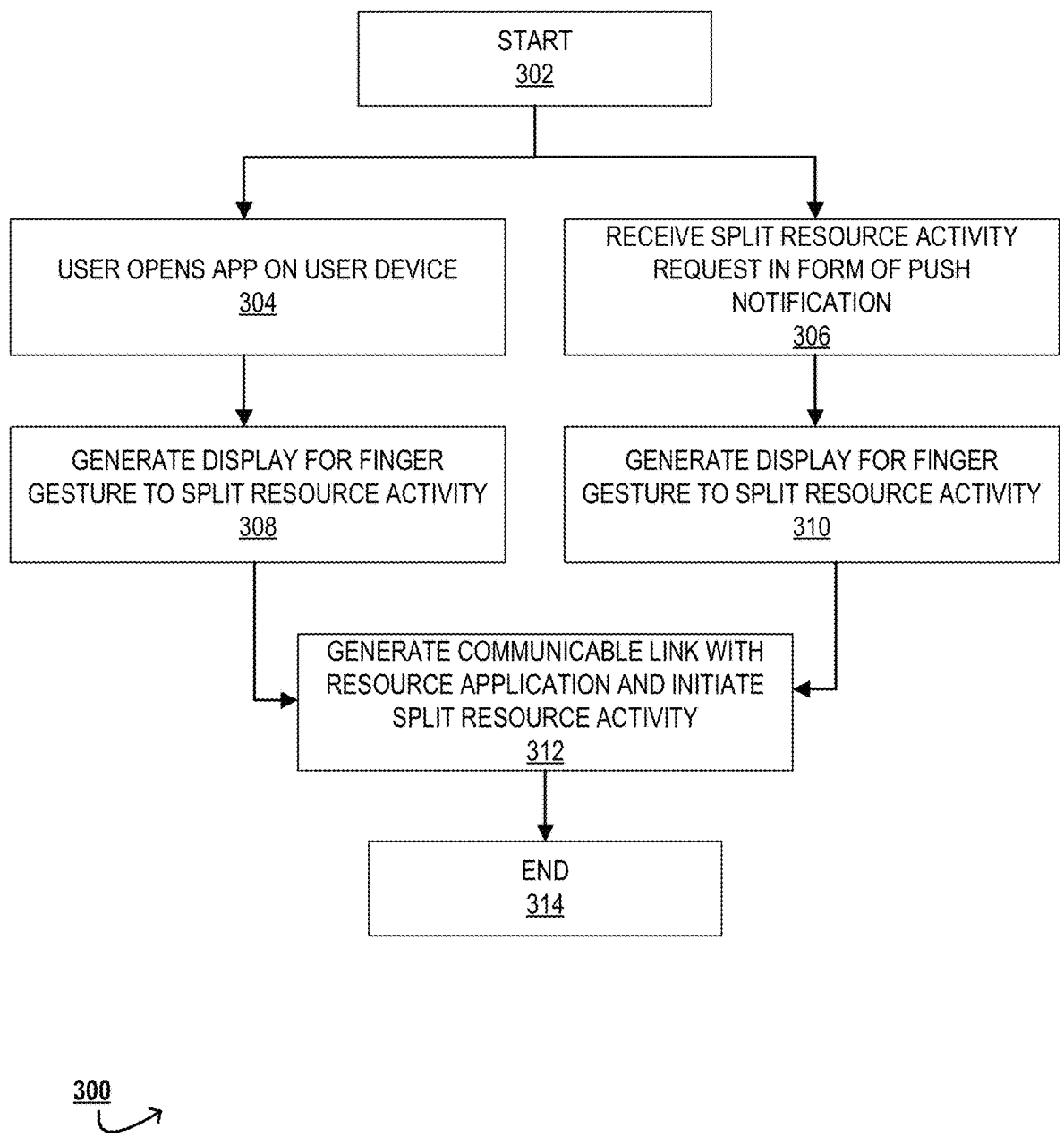
Figure 4:
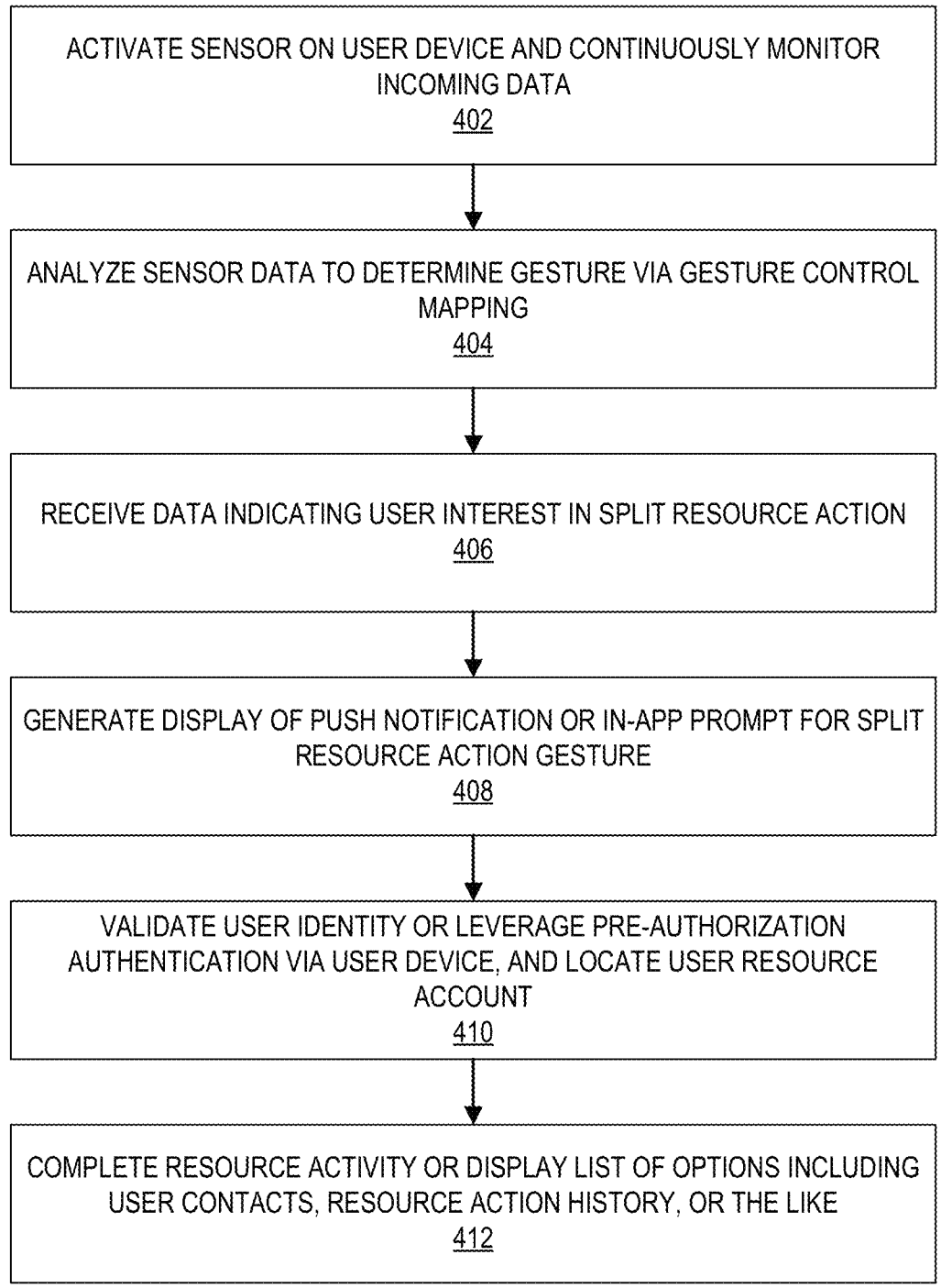

Having thus described embodiments of the invention in general terms, reference will now be made to the accompanying drawings, wherein:

FIG. 1 depicts a non-contact instructions environment 100, in accordance with one embodiment of the present invention;

FIG. 2 depicts a non-contact verification process 200, in accordance with one embodiment of the present invention; and FIG. 3 depicts a process flow 300 for user resource activity interaction, in accordance with one embodiment of the present invention; and FIG. 4 depicts a process flow 400 for completing a split resource activity, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

It is understood that "user devices," such as user device(s) 140, may represent various forms of electronic devices, including user input devices such as personal digital assistants, cellular telephones, smartphones, laptops, desktops, webcams, microphones, scanners, printers, projectors, speakers, CD/DVD-drives, and/or the like, merchant input devices such as point-of-sale (POS) devices, electronic payment kiosks, and/or the like, resource dispensing devices (e.g., automated teller machine (ATM)), and/or edge devices such as routers, routing switches, integrated access devices (IAD), and/or the like. In the case of user device 140 representing an ATM, the device may contain specialized equipment such as video sensors, camera sensors, proximity sensors, infrared sensors, or the like, which enable the user 102 to enter information in a touchless manner.

As used herein, a "user interface" or "UI" may be an interface for user-machine interaction. In some embodiments, such as in the case of a user interaction with an ATM, the user interface may allow for interaction without physical touch of the user device, such as gesturing. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety. In some embodiments, the GUI may respond intelligently to user gestures via the user devices ability to record or recognize user movements near the device, over a keypad, over a virtually rendered keypad on the GUI, or the like.

FIG. 1 depicts a non-contact instructions environment 100, in accordance with one embodiment of the present invention. As illustrated in FIG. 1, a non-contact instructions system 108 is operatively coupled, via a network 101 to a user device 104, to an entity system 106, and to a third party system 105. In this way, the non-contact instructions system 108 can send information to and receive information from the user device 104, the entity system 106, and the third party system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide images for analysis, recognition and extraction, query the non-contact instructions system 108 for identified attributes, set parameters and metrics for data analysis, and/or receive/utilize centralized database information created and disseminated by the non-contact instructions system 108. As such, in some embodiments, the user 102 may be associated with the entity and/or a financial institution. In other embodiments, the user 102 may be associated with another system or entity, such as third party system 105, which may be granted access to the non-contact instructions system 108 or entity system 106 in some embodiments.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to various data from the system 108, or transmission of various data to the system 108. The processing device 114 is operatively coupled to the communication device 112 and the memory device 116. The processing device 114 uses the communication device 112 to communicate with the network 101 and other devices on the network 101, such as, but not limited to, the entity system 106, the non-contact instructions system 108 and the third-party system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the non-contact instructions system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the non-contact instructions system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, based on computer-readable instructions thereof, which may be stored in a memory device, for example, executing computer readable instructions 154 or computer-readable program code 154 stored in memory device 150 to perform one or more functions associated with the non-contact instructions system 108.

The processing device 148 is operatively coupled to the communication device 146 and the memory device 150. The processing device 148 uses the communication device 146 to communicate with the network 101 and other devices on the network 101, such as, but not limited to the entity system 106, the third party system 105, and the user system 104. As such, the communication device 146 generally comprises a modem, server, or other device for communicating with other devices on the network 101.

As further illustrated in FIG. 1, the non-contact instructions system 108 comprises the computer-readable instructions 154 stored in the memory device 150, which in one embodiment includes the computer-readable instructions for the implementation of a convolutional neural network model ("CNN model") 156. In some embodiments, the computer readable instructions 154 comprise executable instructions associated with the CNN model 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the CNN model 156 and its components/modules. The CNN model 156 is further configured to perform or cause other systems and devices to perform the various steps in processing software code, and organizing data as will be described in detail later on.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to the CNN model 156, entity system 106, user device 104, and third party system 105 and/or other systems and applications, to perform one or more steps described throughout this disclosure. Although various data processing steps may be described as being performed by the CNN model 156 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the non-contact instructions system 108 may include multiple systems, servers, computers or the like maintained by one or many entities. FIG. 1 merely illustrates one of those systems 108 that, typically, interacts with many other similar systems to form the information network. In one embodiment of the invention, the non-contact instructions system 108 is operated by the entity associated with the entity system 106, while in another embodiment it is operated by a second entity that is a different or separate entity from the entity system 106. In some embodiments, the entity system 106 may be part of the non-contact instructions system 108. Similarly, in some embodiments, the non-contact instructions system 108 is part of the entity system 106. In other embodiments, the entity system 106 is distinct from the non-contact instructions system 108.

In one embodiment of the non-contact instructions system 108, the memory device 150 stores, but is not limited to, the CNN model 156. In one embodiment of the invention, the CNN model 156 may associated with computer-executable program code that instructs the processing device 148 to operate the communication device 146 to perform certain communication functions involving the third party system 105, the user device 104 and/or the entity system 106, as described herein. In one embodiment, the computer-executable program code of an application associated with the CNN model 156 may also instruct the processing device 148 to perform certain logic, data processing, and data storing functions of the application.

The processing device 148 is configured to use the communication device 146 to receive data, such as images, or metadata associated with images, transmit and/or cause display of extracted data and the like. In the embodiment illustrated in FIG. 1 and described throughout much of this specification, the CNN model 156 may perform one or more of the functions described herein, by the processing device 148 executing computer readable instructions 154 and/or executing computer readable instructions associated with one or more application(s)/devices/components of the CNN model 156.

As illustrated in FIG. 1, the entity system 106 is connected to the non-contact instructions system 108 and may be associated with a financial institution network. In this way, while only one entity system 106 is illustrated in FIG. 1, it is understood that multiple network systems may make up the system environment 100 and be connected to the network 101. The entity system 106 generally comprises a communication device 136, a processing device 138, and a memory device 140. The entity system 106 comprises computer-readable instructions 142 stored in the memory device 140, which in one embodiment includes the computer-readable instructions 142 of an institution application 144. The entity system 106 may communicate with the non-contact instructions system 108. The non-contact instructions system 108 may communicate with the entity system 106 via a secure connection generated for secure encrypted communications between the two systems for communicating data for processing across various applications.

As further illustrated in FIG. 1, in some embodiments, the non-contact authorization system environment 100 further comprises a third party system 105, in operative communication with the non-contact instructions system 108, the entity system 106, and/or the user device 104. Typically, the third party system 105 comprises a communication device, a processing device and memory device with computer readable instructions. In some instances, the third party system 105 comprises a first database/repository comprising software code or program component objects, and/or a second database/repository comprising functional source code associated with software or program component objects and attributes. These applications/databases may be operated by the processor executing the computer readable instructions associated with the third party system 105, as described previously. Although a single external third party system 105 is illustrated, it should be understood that, the third party system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 depicts a non-contact verification process 200, in accordance with one embodiment of the present invention. As shown in block 202, the process begins by initially verifying a user access credential via the user device 104. In some embodiments, the user access credential may be a login and password combination, biometric authentication method, personal identification number (PIN) code, or the like, which allows the user to access on or more entity applications 144 designed to coordinate access to and control of one or more of the user's resource accounts. Next, the system generates and displays a user prompt for a gesture, as shown in block 204, and simultaneously initiates data collection via one or more device sensors, as shown in block 206. In some embodiments, the initiation of data collection via one or more device sensors may actually begin prior to the generation of display of a user prompt. For instance, in some embodiments, the user device 104 may contain one or more proximity sensors that recognize a user approaching the user device 104, or has begun interacting with the user device 104, and immediately initiate data collection via one or cameras, video cameras, infrared sensors, or the like, as soon as the user is recognized as interacting with the user device 104. In some embodiments, this recognition may be achieved through the use of the one or more proximity sensors of the user device 104, or may be achieved my recognizing that the user device 104 is actively using computing resources to conduct tasks beyond background tasks, such as the user actively interacting with the entity application 144, or the like. In some embodiments, data collected during this process is stored in a secure user configuration associated with the user as a part of the data repository 160. In some embodiments, the user may be identified via the collected imaging data, such as via a facial recognition process powered by the CNN model 156. Once the user is identified, the system may locate a previously generated user configuration for the user stored in the data repository 160, and may store collected data in an encrypted format in the user configuration for later reference and analysis (e.g., the system may conduct various analyses on collected user interaction data related to their movements, gait, gestures, mannerisms, appearance, or the like, which can be later used to verify the user's identity and keep their resource accounts secure from unauthorized access).

As shown in blocks 208 and 210, the system may then either validate user input, or reject user input, respectively, based on the response of the user to the generated gesture prompt. In the event that the user input is rejected, as indicated in block 210, the system may attempt to rectify a possible system error by repeating the gestured entry process in conjunction with a simultaneous recalibration event. The system may generate an additional display prompt for the user gesture, and reset the gesture collection process, as indicated in block 214. Next, as indicated in block 216, the system may repeat data collection via the one or more device sensors of user device 104. As the user completes the gesturing motion, the system may attempt to apply a slightly altered or different CNN model 156 algorithm in order to discern the user gesture input. If the user gesture input is validated, the system may proceed to validate the user input, as shown in block 218. Given that the user gesture input may differ slightly for each user, the system may store unique gesture pattern data for the user in a user configuration as a part of data repository 160.

In some embodiments, when the system rejects user input as indicated in block 210, or if the user has provided a gesture in error, the system may allow the user to gesture in a specific manner in order to restart the gesture input process. For instance, when generating the display of user prompt for user gesture input, the system may also generate text or animations on the display to indicate that waving the user's hand over the screen of the user device 104 will cause the gesture input process to reset and start from the beginning of the data capture process. For instance, if the system detects that the user waves their hand past a data sensor of the user device, the system may generate a display to indicate that the previous gesture input data has been cleared. In this way, the user may conveniently start the process of gesturing over again without the need to navigate a menu system, repeatedly press a backspace button, "clear" button, or the like. Given that users may not be familiar with the user gesture input process initially, or that the system may not have calibrated for the specific user yet, this allows the user an intuitive way to start the process again if user gesture entry is not accurate on the first attempt.

FIG. 3 depicts a process flow 300 for user resource activity interaction, in accordance with one embodiment of the present invention. As shown in FIG. 3, the start 302 of the process can be initiated in two primary fashions. The first is indicated in block 304, wherein the user may open an application on user device 104, such as entity application 144. In this instance, the system may begin collecting sensor data immediately. For instance, the user may tap their user device's screen to open a mobile banking application. In an initial set-up or onboarding process, the system may request the user's permission to access the camera of the device, or the like, and store the user's acceptance or denial of allowing this data access. If the user has indicated that they will allow access to the device camera, the system may use the user device camera, or other sensors, such as infrared sensors, proximity sensors, audio sensors such as microphones, or the like, during the time in which the user is interacting with the entity application 144. In this way, the system may initiate data collection via the camera of the user device immediately after the user opens the entity application 144 at any time following the initial set-up or onboarding process.

In other embodiments, the user may receive a split payment, or split resource activity, request in the form of a push notification generated by the system, as indicated in block 306. For instance, even at times when the user is not interacting with the entity application 144, the system may be running processes in the background in order to monitor situations where a split resource activity may be required. For instance, if the user makes a purchase using a resource instrument connected to their resource account managed by the entity, the system may recognize that that transaction has occurred, and may pre-emptively push a notification to the user in order to prompt the user to initiate a split resource activity request. For instance, the system may continuously monitor the user's resource account history in order to identify a transaction, resource activity, or the like, that has just occurred. In some embodiments, the resource activity may be a transaction at a restaurant, sporting event, or the like, in which the user spends a certain resource amount. If the resource amount exceeds a certain category-based threshold, or exceeds an average amount spent at a given merchant or location, the system may generate a prediction that the resource activity may have involved more than one party. For instance, if the user's resource activity history on their resource account shows a transaction history for $10, $12, and $8 at a specific coffee shop, the system may calculate a running average of these transaction values over time and store it in the user configuration associated with the user. In this way, the system may determine that the user typically spends a certain amount at a given coffee shop location; in this instance, an average of about $10 at the particular coffee shop. If a later resource activity is recognized as exceeding the average value by a given percentage amount, for example, in some embodiments, greater than 40% more than the average amount, or the like, then the system may determine that the user has paid for a friend, colleague, family member, or the like. In this way the system may deduce that the user may want to initiate a split resource activity in order to request a certain amount from another user in the form of a peer-to-peer (P2P) payment.

In some embodiments, the system may simultaneously monitor geolocation data via the user device 104. In some embodiments, one of the user's contacts may also maintain a resource account with the entity, and the system may monitor the user's location, and the location of the user's contact. For instance, the user configuration for the user and the user's contact may include the users' phone numbers, device identification numbers, IP addresses, or the like. The system may perform a cross comparison of the user's contacts with other known users in the area that maintain an account with the entity. In this way, the system may recognize, in conjunction with the fact that the user may have paid for a family member, friend, or colleague, that the user is also in close proximity to someone from their contacts. In this way, the system may not only deduce that the user may like to split the resource activity, but may also deduce a probable contact that the user would like to direct the request to.

As shown in blocks 308 and 310, following the user initiated interaction with the entity application 144, or the determination that the user may be interested in a split resource activity request and generating the push notification, the system may generate a display for a finger gesture to initiate a split resource action. For instance, the system may display, via the entity application 144, on the user device 104, a graphic or text indicating that the user may gesture in a "scissor" motion, wherein they extend and move their middle and index finger together and apart, within view of the user device 104 camera sensor, in order to indicate that they would like to initiate a split resource action. Following the user's gesture, the system may generate a communicable link with a backend resource application or payment rail, and initiate the split resource activity on the user's behalf, as shown in block 312. The process then ends as shown in block 314, after the system has initiated the split resource activity.

FIG. 4 depicts a process flow 400 for completing a split resource activity, in accordance with one embodiment of the present invention. As shown in block 402, the process begins whereby the system activates a device sensor on the user device 104 in order to continuously monitor incoming data. For instance, the system may monitor a video feed, or the like, from a camera sensor of the user device 104. As shown in block 404, the system may analyze the incoming data in order to determine a user gesture, and may determine a gesture via control mapping, wherein if the video feed data indicates a confidence that the user is gesturing in a manner in accordance with a split payment gesture, then the system initiates a split payment process automatically.

As shown in block 406, the system may also receive data indicating potential user interest in a split resource activity. As discussed with regard to FIG. 3, the system may simultaneously monitor resource account history of the user in order to determine when a split resource activity may be appropriate, or what contacts of the user may be in close proximity or in recent communication with the user. The system may then generate a display of a push notification to the user, or an in-app prompt, such as a pop up notification, if the user is already using the entity application 144, as shown in block 408. The system may validate the user's identity via biometrics, password combination, or other secure means, and may locate the user's resource account using a backend resource processing application. As shown in block 410, the system may then either automatically complete the resource activity, or display a list of options to the user, which may include a list of potential contacts with which the user may be interested in splitting the resource activity with, suggested amounts based on recent transactions, or the like. In some embodiments, the system may allow the user to tailor the split resource activity request to include a message, tagline, subject field, specific amount, requested currency type, time period for reply before the request times out, or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for identifying and authorizing non-contact instructions, the system comprising:
  a memory device; and
  a processing device operatively coupled to the memory device, wherein the processing device is configured to execute computer-readable program code to:
  continuously monitor a data capture sensor via a user device;
  analyze the data capture sensor data using convolutional neural network modeling in order to identify a specific gesture;
  in response to identification of the specific gesture, generate a prompt for display on the user device indicating an option for a split resource activity;
  receive an input response via the user device indicating that the user wishes to complete the split resource activity;
  map the specific gesture to the split resource activity by initiating a transfer of resources from a resource account of the user to a resource account of one of the user's contacts; and
  store user gesture input data in a user configuration associated with a resource account number and the user's identity.

2. The system of claim 1, further configured to:
  continuously monitor resource account activity of a resource account of the user;
  identify a first merchant with which the user has transacted multiple times;
  calculate an average resource value for transactions with the first merchant from the resource account of the user;
  identify a later resource activity from the resource account of the user to the first merchant that is above a pre-set threshold, wherein the pre-set threshold is a percentage above the average resource value; and
  generate a push notification to the user device.

3. The system of claim 2, wherein the push notification to the user device further comprises a recommendation or option to initiate a split resource activity.

4. The system of claim 3, wherein the split resource activity comprises a request for payment of resources from one or more of the user's contacts.

5. The system of claim 2, further configured to monitor a geolocation one or more user devices, cross references the user devices with the user's contacts, and identify one or more specific contacts in proximity to the user at a time coinciding with the later resource activity.

6. The system of claim 1, wherein the one or more data capture sensors further comprise one or more proximity sensors and one or more camera sensors.

7. A computer program product for identifying and authorizing non-contact instructions, the computer program product comprising at least one non-transitory computer readable medium comprising computer readable instructions, the instructions comprising instructions for:
   continuously monitoring a data capture sensor via a user device;
   analyzing the data capture sensor data using convolutional neural network modeling in order to identify a specific gesture;
   in response to identification of the specific gesture, generating a prompt for display on the user device indicating an option for a split resource activity;
   receiving an input response via the user device indicating that the user wishes to complete the split resource activity;
   mapping the specific gesture to the split resource activity by initiating a transfer of resources from a resource account of the user to a resource account of one of the user's contacts; and
   storing user gesture input data in a user configuration associated with a resource account number and the user's identity.

8. The computer program product of claim 7, the instructions comprising instructions for:
   continuously monitoring resource account activity of a resource account of the user;
   identifying a first merchant with which the user has transacted multiple times;
   calculating an average resource value for transactions with the first merchant from the resource account of the user;
   identifying a later resource activity from the resource account of the user to the first merchant that is above a pre-set threshold, wherein the pre-set threshold is a percentage above the average resource value; and
   generating a push notification to the user device.

9. The computer program product of claim 8, wherein the push notification to the user device further comprises a recommendation or option to initiate a split resource activity.

10. The computer program product of claim 9, wherein the split resource activity comprises a request for payment of resources from one or more of the user's contacts.

11. The computer program product of claim 8, the instructions comprising instructions for:
   monitoring a geolocation one or more user devices, cross references the user devices with the user's contacts, and identify one or more specific contacts in proximity to the user at a time coinciding with the later resource activity.

12. The computer program product of claim 7, wherein the one or more data capture sensors further comprise one or more proximity sensors and one or more camera sensors.

13. A computer implemented method for a identifying and authorizing non-contact instructions, said computer implemented method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   continuously monitor a data capture sensor via a user device;
   analyze the data capture sensor data using convolutional neural network modeling in order to identify a specific gesture;
   in response to identification of the specific gesture, generate a prompt for display on the user device indicating an option for a split resource activity;
   receive an input response via the user device indicating that the user wishes to complete the split resource activity;
   map the specific gesture to the split resource activity by initiating a transfer of resources from a resource account of the user to a resource account of one of the user's contacts; and
   store user gesture input data in a user configuration associated with a resource account number and the user's identity.

14. The computer implemented method of claim 13, further configured to:
   continuously monitor resource account activity of a resource account of the user;
   identify a first merchant with which the user has transacted multiple times;
   calculate an average resource value for transactions with the first merchant from the resource account of the user;
   identify a later resource activity from the resource account of the user to the first merchant that is above a pre-set threshold, wherein the pre-set threshold is a percentage above the average resource value; and
   generate a push notification to the user device.

15. The computer implemented method of claim 14, wherein the split resource activity comprises a request for payment of resources from one or more of the user's contacts.

16. The computer implemented method of claim 15, wherein the one or more data capture sensors further comprise one or more proximity sensors and one or more camera sensors.

17. The computer implemented method of claim 14, further configured to monitor a geolocation one or more user devices, cross references the user devices with the user's contacts, and identify one or more specific contacts in proximity to the user at a time coinciding with the later resource activity.

* * * * *